United States Patent [19]

Uozumi

[11] Patent Number: 4,509,060
[45] Date of Patent: Apr. 2, 1985

[54] SHEET SEPARATION SYSTEM FOR THERMAL TRANSFER TYPE RECORDING APPARATUS

[75] Inventor: Osamu Uozumi, Zushi, Japan

[73] Assignee: Ricoh Company, Ltd., Tokyo, Japan

[21] Appl. No.: 525,380

[22] Filed: Aug. 22, 1983

[30] Foreign Application Priority Data

Aug. 25, 1982 [JP] Japan ................................ 57-147296

[51] Int. Cl.³ ..................... G01D 15/10; G01D 15/24; B65H 3/22
[52] U.S. Cl. ............................... 346/76 PH; 346/136; 271/18.3
[58] Field of Search ............... 346/76 PH, 136, 135.1; 271/18.3, DIG. 2

[56] References Cited

U.S. PATENT DOCUMENTS 4,404,568 9/1983 Kikuchi et al. ................ 346/76 PH
4,454,517 6/1984 Kagaya ...................... 346/76 PH X Primary Examiner—George H. Miller, Jr.
Attorney, Agent, or Firm—David G. Alexander

[57] ABSTRACT

In a thermal transfer type recording apparatus, a sheet separation system includes a separator member positioned downstream of a thermal head with respect to a predetermined path which a recording sheet and an ink sheet move in contact with each other. The separator member is selectively controlled to move between an inoperative position above the sheet path and an operative position below the inoperative position and which interferes with the sheet path. In the operative position, the separator member pierces the ink sheet downwardly to push the underlying recording sheet away from the ink sheet.

10 Claims, 6 Drawing Figures 4,509,060

SHEET SEPARATION SYSTEM FOR THERMAL TRANSFER TYPE RECORDING APPARATUS

BACKGROUND OF THE INVENTION

The present invention relates to a thermal transfer type recording apparatus which feeds a recording sheet and an ink sheet in layers and causes a thermal head to selectively heat the ink sheet to transfer ink from the former to the latter for thereby producing a desired image thereon. More particularly, the present invention relates to a sheet separation system for separating the recording sheet from the ink sheet after the ink transfer.

In a recorder of the type described, a recording sheet is fed to a thermal head with its image forming surface held in contact with an ink surface of an ink sheet. The thermal head, in response to input video information, transfers ink from the ink sheet to the recording sheet by application of heat. The recording sheet carrying the information thereon is separated from the ink sheet in a predetermined position. A problem encountered with such a recorder is that it is difficult to smoothly separate the processed recording sheet from the ink sheet. The difficulty is significant when a leading end portion of the recording sheet is smeared throughly black or, if not throughly, occupied by images in a high density. Such an ink distribution at the leading end portion of the recording sheet makes it difficult to separate the ink sheet therefrom. This phenomenon is more enhanced when the recorder is used in hot and humid ambient conditions. Should the separation be incomplete, the recording sheet would be entrained by the ink sheet to result in sheet jams, damage to the recording sheet and other troubles.

Various sheet separation systems for a recorder of the type concerned have heretofore been proposed to solve the problem mentioned above. One of them is constructed to sharply deflect an ink sheet at a predetermined position relative to a recording sheet, while allowing the latter to advance horizontally. However, this prior art sheet separation system is not more than a passive measure which simply utilizes the physical property of sheets and, therefore, lacks in reliability.

Another and more positive prior art sheet separation system uses a pawl or like separating member to forcibly separate a recording sheet from an ink sheet. However, just as it solves the problem of poor reliability in operation, it creates another problem concerning the quality of produced images. The separating member, which abuts against the ink surface of the ink sheet at its leading end, tends to shave the ink off the sheet surface to smear unwanted areas of a recording sheet therewith.

SUMMARY OF THE INVENTION

It is therefore an object of the present invention to provide a sheet separation system for a thermal transfer type recording apparatus which is capable of positively and surely separating a recording sheet from an ink sheet.

It is another object of the present invention to provide a sheet separation system for a thermal transfer type recording apparatus which allows a recording sheet to be smoothly separated from an ink sheet without suffering from damage to images produced thereon.

It is another object of the present invention to provide a generally improved sheet separation system for a thermal transfer type recording apparatus.

In a thermal transfer type recording apparatus having a thermal head located in a predetermined position where the thermal head faces a predetermined path along which a recording sheet and an ink sheet move in contact with each other, the thermal head selectively heating the ink sheet in response to video information to thermally transfer ink from the ink sheet to the recording sheet in order to produce the video information on the recording sheet, a system for separating the recording sheet from the ink sheet after the thermal transfer of video information of the present invention comprises a separator means located in the sheet path downstream of the thermal head to face the ink sheet. The separator means is selectively movable to a position inside the sheet path and a position outside the sheet path. Drive means is provided for driving the separator means to the position inside the sheet path to cause the separator means to pierce the ink sheet, which is in contact with the recording sheet, and urge the recording sheet away from the ink sheet.

The above and other objects, features and advantages of the present invention will become apparent from the following detailed description taken with the accompanying drawings.

DESCRIPTION OF THE PREFERRED EMBODIMENTS

While the sheet separation system for a thermal transfer type recording apparatus of the present invention is susceptible of numerous physical embodiments, depending upon the environment and requirements of use, substantial numbers of the herein shown and described embodiments have been made, tested and used, and all have performed in an eminently satisfactory manner.

In order to better understand the principles underlying the present invention, a brief description of two prior art sheet separation systems will be given first, with particular reference to FIGS. 1 and 2.

Figure 1:
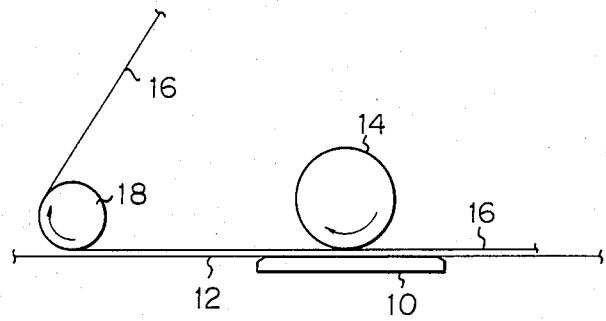
FIGS. 1 and 2 are schematic elevations of two examples of prior art sheet separation systems applicable to a thermal transfer type recording apparatus.

The sheet separation system shown in FIG. 1 includes a thermal head 10 which defines an image transfer station. A recording sheet 12 is fed by a roller 14 together with an ink sheet 16 through the image transfer station. In a position downstream of the image transfer station, a roller 18 deflects the ink sheet 16 at a large angle to the recording sheet 12. This is the system which relies on the physical property of sheets.

Figure 2:
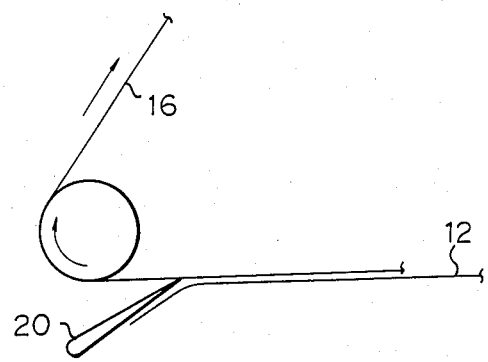

Another prior art system is shown in FIG. 2 which uses a positive sheet separating member such as a pawl 20. The pawl 20 has its leading end kept in contact with an ink surface of the ink sheet 16, so that the recording sheet 12 is forced away from the ink sheet 16.

The implementations shown in FIGS. 1 or 2, however, are not fully satisfactory due to their inherent drawbacks as earlier mentioned.

Figure 3:
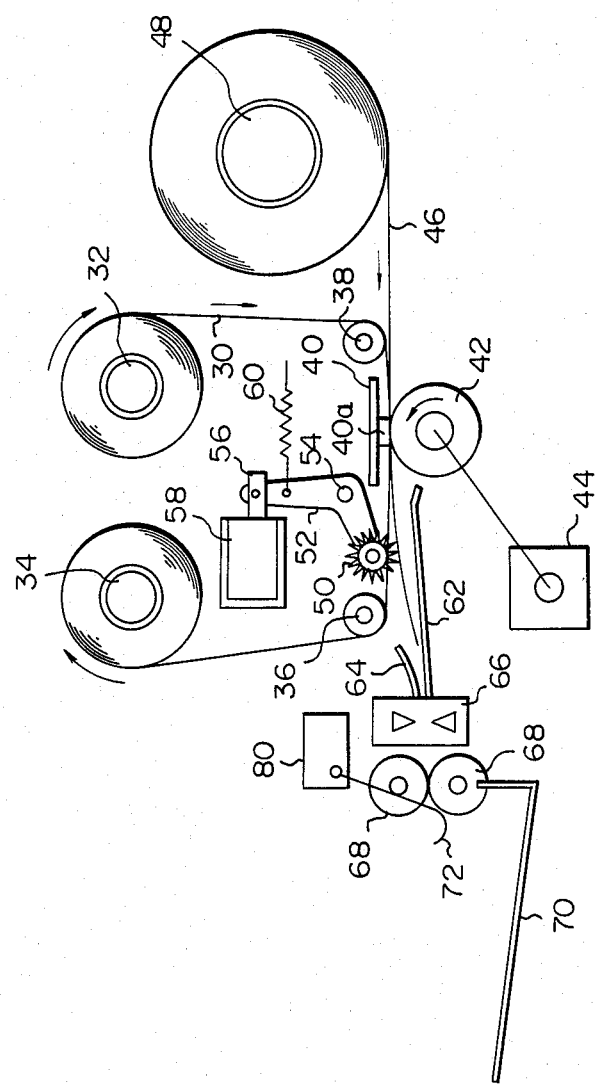
FIG. 3 is a side elevation of a thermal transfer type recorder furnished with a sheet separation system embodying the present invention.

Referring to FIG. 3, a sheet separation system embodying the present invention is shown which is successful to overcome such drawbacks. As shown, an ink sheet 30 is wound around a supply roller 32 at one end and around a take-up roller 34 at the other end. The intermediate span of the ink sheet 30 is stretched between two rollers 36 and 38, which serve as ink sheet support means. A thermal head 40 is located between the rollers 36 and 38 and closer to the upstream roller 38, the ink sheet 30 being held in slidable contact with the thermal head 40. A drive roller 42 is positioned to face the thermal head 40 from below and is in driven connection with a stepping motor 44. A recording sheet 46 is paid out from a roller 48 to merge into the path of the ink sheet 30 so that it underlies the ink sheet 30 in the gap between the thermal head 40 and the drive roller 42. Before the recorder starts its operation, the recording sheet 46 has its front end remote from the roller 48 held in a position 2-5 mm past of a recording section 40a of the thermal head 40, with respect to the direction of travel of the sheet.

A separator member 50, having sawtoothed lugs similar to those of a buzz saw, is positioned between the thermal head 40 and the roller 36. The separator member 50 is movable between a first position spaced a suitable distance above the ink sheet 30, and a second position below the first which will be described. The first position will be referred to as the home position hereinafter.

A generally L-shaped lever 52 is pivotally mounted to a rigid member of the recorder by a pin 54. The separator 50 is rotatably mounted on the free end of one arm of the lever 52. The free end of the other arm of the lever 52 is pivotally connected to a plunger 56 of a solenoid 58, which is rigid on a stationary member of the recorder. A tension spring 60 is anchored at one end to the arm of the lever 52 pivotted to the plunger 52 and, at the other end, to a fixed member (not shown). In the above construction, when the solenoid 58 is energized to pull the plunger 56 thereinto, the lever 52 will swing counterclockwise about the pin 54 away from the home position toward the second position, in which the teeth of the separator 50 thrust into the ink sheet 30. As the solenoid 58 is deenergized to free the plunger 56, the tension spring 60 will pull the plunger 56 out of the solenoid 58 thereby moving the lever 52 clockwise toward the home position about the pin 54. It will be seen that the lever 15, solenoid 17, spring 18 and the like are the major elements of one form of means for generating a separating motion.

A sheet guide 62 is located to face the separator 50 through the path of the ink sheet and recording sheet. The sheet guide 62 cooperates with a sheet guide 64 located thereabove to define a path which will guide the recording sheet 46 toward a cutter 66. That is, the sheet guide 62 is inclined in such a manner as to become more spaced from the ink sheet 30 stretched flat between the rollers 36 and 38 as the recording sheet 46 advances in the predetermined direction. A pair of discharge rollers 68 are located adjacent to the outlet side of the cutter 66. A copy tray 70 for receiving sheets cut by the cutter 66 is positioned below the rollers 68.

An actuator 72 extends downward from a microswitch 80 as far as a position where its lower end interferes with the sheet which comes out from the discharge roller pair 68. On sensing the front end of the sheet 46, the actuator 72 will move to actuate the microswitch 80.

Before the recorder begins to operate, the ink sheet 30 is held under a suitable magnitude of tension throughout its span between the rollers 32 and 34 due to a suitable friction torque which is developed by a friction clutch (not shown) acting between the rollers 32 and 34. That is, the ink sheet 30 is stretched flat between the rollers 36 and 38. The recording sheet 46, on the other hand, is maintained stationary in such a position that its front end is spaced 2-5 mm from the downstream end of the recording section 40a of the thermal head 40, as previously mentioned.

When the recorder starts operation, the thermal head 40 and stepping motor 44 are energized. The motor 44 rotates the drive roller 42 as indicated by an arrow to index the ink sheet 30 and recording sheet 46. Counter means (not shown) counts the indexing movements of the motor 44 to cause the solenoid 58 to be energized precisely at a predetermined timing, at which the front end of the sheet 46 will become located just ahead of the position of the separator 50. When energized, the solenoid 58 pulls the plunger 56 causing the lever 52 to swing counterclockwise about the pin 54, whereby the separator 50 is lowered from the home position. Then, the separator 50 breaks through the ink sheet 30 by its teeth and moves further downward to a position where it awaits the arrival of the sheet 46. As the front end of the sheet 46 reaches the separator 50, the separator 50 forces the sheet end downwardly clear of the sheet 30 while rotating on the lever 52. The front end of the sheet 46 is led to the path defined between the opposite sheet guides 62 and 64 to be fully separated from the sheet 30.

As the thermal head 40 is deactivated at the end of the recording operation, the sheet 46 is fed forwardly by an additional amount equal to the distance between the cutter 20 and the recording section 40a of the thermal head 40. As soon as the part of the sheet 46 which was positioned at the recording section 40a at the end of the recording operation is brought to the cutter 66, the cutter 66 is actuated to cut the sheet 46. The cut piece of the sheet 46 is laid on the copy tray 70 as a copy sheet. At this instant, the rotating direction of the motor 44 is reversed to reverse that of the drive roller 42, so that the sheet 46 upstream of the cutter 66 is fed backwardly or to the right in the drawing. The motor 44 and thereby the drive roller 42 stops moving as soon as the front end of the sheet 46 regains the position 2-5 mm past of the recording section 40a, with respect to the direction of recording movement.

Meanwhile, when the actuator 72 senses the front end of the sheet 46 which is caught by the discharge rollers 68, it actuates the microswitch 80 which is electrically connected to the solenoid 58. This deenergizes the solenoid 58 to release the plunger 56 and thereby causes the lever 52 to swing clockwise about the pin 54 under the action of the spring 60, entraining the separator 50 to its home position. Such a timed operation prevents the part of the sheet 30 broken by the separator 50 from serving another recording operation, while minimizing the amount of broken part. This is because the sheet 46 will not be entrained by the sheet 30 if only its front end is caught by the discharge rollers 68.

The above-mentioned timing for raising the separator 50 is desirable for other reasons as well. Should the sheet 30 be broken more than necessary, it might be creased by the backward feed. Should the separator 50 be lowered for a long period of time, it would rub the image surface of the sheet 46 to smear it. It will be seen that the sheet 30 is disposed after used once and, therefore, breaking it during separation does not matter at all.

In the embodiment described, while a single separator 50 suffices the purpose, it is more desirable for smooth sheet separation that a plurality of such separators 50 be arranged side by side perpendicularly to the moving direction of the sheets, that is, to the sheet surface of FIG. 3.

Figure 4:
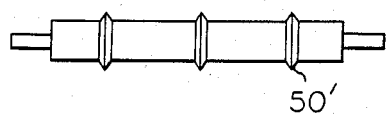
FIG. 4 is a front view of a modification to a sheet separating member shown in FIG. 3.
Figure 5:
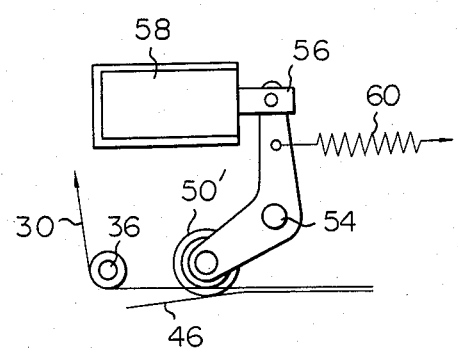
FIG. 5 is a schematic view of a sheet separation system which employs the separating member of FIG. 4.

FIGS. 4 and 5 illustrate another embodiment of the present invention, particularly another example of the separator. As shown, the separator designated by the reference numeral 14' comprises a disc formed with teeth therearound.

Figure 6:
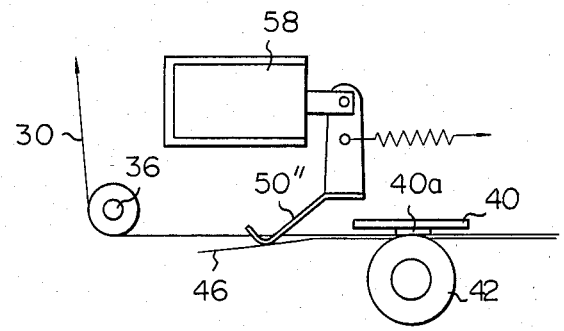
FIG. 6 is a schematic view of another embodiment of the present invention.

FIG. 6 shows still another embodiment of the present invention which includes a modified separator 50''. This separator 50'', unlike the separator 50 or 50', is configured as a pawl having a generally L-shaped cross-section.

It will be understood that the separator in any one of the foregoing embodiments has to be machined to have teeth or edges which are round enough to be incapable of breaking or otherwise damaging the recording sheet 46 although capable of piercing the ink sheet 30.

In summary, it will be seen that the present invention provides a sheet separation system for a thermal transfer type recording apparatus which surely separates a recording sheet from an ink sheet without disturbing images reproduced on the recording sheet.

Various modifications will become possible for those skilled in the art after receiving the teachings of the present disclosure without departing from the scope thereof. For example, the positional relationship between the cutter 66 and the actuator 72 and discharge roller pair 68 may be reversed in order to cause the sheet 46 to be nipped by the rollers 68 at a timing earlier than the described. Such a timing will shorten each length of the ink sheet 30 which is pierced by the separator.

What is claimed is:

1. In a thermal transfer type recording apparatus having a thermal head located in a predetermined position where the thermal head faces a predetermined path along which a recording sheet and an ink sheet move in contact with each other, the thermal head selectively heating the ink sheet in response to video information to thermally transfer ink from the ink sheet to the recording sheet in order to produce the video information on the recording sheet, a system for separating the recording sheet from the ink sheet after the thermal transfer of video information, comprising:

separator means located in said sheet path downstream of the thermal head to face the ink sheet, said separator means being selectively movable to a position inside the sheet path and a position outside the sheet path; and drive means for driving said separator means to the position inside the sheet path to cause the separator means to pierce the ink sheet, which is in contact with the recording sheet, and urge the recording sheet away from the ink sheet.

2. The system as claimed in claim 1, in which the separator means comprises at least one buzz saw-shaped rotatable member.

3. The system as claimed in claim 1, in which the separator means comprises at least one disc-shaped rotary member which has teeth at a peripheral edge thereof.

4. The system as claimed in claim 1, in which the separator means comprises at least one pawl-shaped pivotable member.

5. The system as claimed in claim 1, in which the drive means comprises an actuator for moving the separator means to the position inside the sheet path.

6. The system as claimed in claim 5, in which the actuator comprises a solenoid.

7. The system as claimed in claim 5, in which the drive means further comprises returning means for returning the separator means to the position outside the sheet path.

8. The system as claimed in claim 7, in which the returning means comprises a tension spring.

9. The system as claimed in claim 7, in which the drive means further comprises means for transmitting a drive force generated by the actuator to the separator means.

10. The system as claimed in claim 9, in which the transmitting means comprises a pivotable angled arm.

* * * * *